(12) United States Patent
Faruque et al.

(10) Patent No.: US 12,545,157 B2
(45) Date of Patent: Feb. 10, 2026

(54) LIFTER FOR VEHICLE SEAT BOTTOM

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 171 days.

(21) Appl. No.: 18/512,845

(22) Filed: Nov. 17, 2023

(65) Prior Publication Data
US 2025/0162475 A1 May 22, 2025

(51) Int. Cl.
| | |
|---|---|
| *B60N 2/42* | (2006.01) |
| *B60N 2/427* | (2006.01) |
| *B60N 2/62* | (2006.01) |
| *B60N 2/90* | (2018.01) |

(52) U.S. Cl.
CPC ....... *B60N 2/42763* (2013.01); *B60N 2/4279* (2013.01); *B60N 2/914* (2018.02); *B60N 2/62* (2013.01)

(58) Field of Classification Search
CPC ...... B60N 2/42763; B60N 2/62; B60N 2/914; B60N 2/4279
USPC .................................................. 297/284.11
See application file for complete search history.

(56) References Cited

U.S. PATENT DOCUMENTS

| | | | |
|---|---|---|---|
| 2,943,866 A | 7/1960 | Witter | |
| 3,452,834 A | 7/1969 | Gaut | |
| 4,334,709 A * | 6/1982 | Akiyama | B60N 2/62 297/284.11 X |
| 4,767,155 A * | 8/1988 | Kousaka | B60N 2/62 297/284.11 |
| 5,695,242 A | 12/1997 | Brantman et al. | |
| 6,450,573 B1 * | 9/2002 | Yamaguchi | B60N 2/42763 297/216.1 |
| 6,648,409 B1 * | 11/2003 | Laporte | B60N 2/42718 297/216.1 X |
| 6,672,667 B1 | 1/2004 | Park | |
| 6,746,077 B2 * | 6/2004 | Klukowski | B60N 2/42763 297/284.11 |
| 6,837,540 B2 * | 1/2005 | Yamaguchi | B60N 2/42763 297/284.11 |

(Continued)

FOREIGN PATENT DOCUMENTS

JP 2007331445 A * 12/2007 ......... B60N 2/42763

*Primary Examiner* — Rodney B White
(74) *Attorney, Agent, or Firm* — Frank A. MacKenzie; Brooks Kushman P.C.

(57) ABSTRACT

A seat assembly including a seat bottom including a seat frame and a seat cushion supported by the seat frame. The seat frame includes a first side portion and a second side portion spaced cross-seat from each other and the seat frame includes a seat pan extending from the first side portion to the second side portion. The seat assembly includes a cross-member supported by the seat frame between the seat frame and the seat cushion. The seat assembly includes a lifter extending from the seat frame to the cross-member. The lifter is extendable from a lowered position to a raised position. The cross-member abuts the seat pan when the lifter is in the lowered position. The cross-member is spaced from the seat pan when the lifter is in the raised position.

20 Claims, 10 Drawing Sheets

(56) References Cited

U.S. PATENT DOCUMENTS

| | | | | |
|---|---|---|---|---|
| 6,908,149 B1* | 6/2005 | Yamaguchi | ........ | B60N 2/42718 |
| | | | | 297/284.11 |
| 7,150,500 B2* | 12/2006 | Hippel | ................ | B60N 2/4279 |
| | | | | 297/284.11 |
| 7,413,246 B2* | 8/2008 | Saiguchi | .............. | B60N 2/4221 |
| | | | | 297/216.1 X |
| 7,478,873 B2 | 1/2009 | Al-Samarae et al. | | |
| 7,758,121 B2 | 7/2010 | Browne et al. | | |
| 8,061,770 B2* | 11/2011 | Houston | .............. | B60N 2/0244 |
| | | | | 297/216.19 |
| 8,240,758 B2* | 8/2012 | Combest | ........... | B60N 2/42718 |
| | | | | 297/216.19 |
| 8,272,687 B2* | 9/2012 | Gross | ................. | B60N 2/4221 |
| | | | | 297/284.11 |
| 8,297,697 B2* | 10/2012 | Gross | ................ | B60N 2/42718 |
| | | | | 297/284.11 |
| 8,393,681 B2* | 3/2013 | Gross | ................ | B60N 2/42763 |
| | | | | 297/284.11 |
| 8,746,792 B2* | 6/2014 | Ruthinowski | ...... | B60N 2/42718 |
| | | | | 297/284.11 |
| 9,403,452 B2* | 8/2016 | Subramanian | ..... | B60N 2/42763 |
| 9,994,138 B2* | 6/2018 | Whitens | ............. | B60N 2/42763 |
| 10,793,032 B2* | 10/2020 | Ando | ................... | B60N 2/4221 |
| 10,988,062 B2* | 4/2021 | Sekizuka | ........... | B60N 2/42781 |
| 11,027,630 B2* | 6/2021 | Mori | .................... | B60N 2/4221 |
| 11,072,265 B2* | 7/2021 | Humer | ................ | B60N 2/1864 |
| 11,524,649 B2* | 12/2022 | Ohno | .................... | B60R 21/207 |
| 11,554,696 B2* | 1/2023 | Hu | ..................... | B60N 2/42763 |
| 2002/0003365 A1* | 1/2002 | Yamaguchi | ........ | B60N 2/42763 |
| | | | | 297/216.1 |
| 2002/0053792 A1* | 5/2002 | Yamaguchi | ........ | B60N 2/42763 |
| | | | | 297/216.1 X |
| 2002/0053793 A1* | 5/2002 | Yamaguchi | .......... | B60N 2/4221 |
| | | | | 297/216.1 X |
| 2009/0045614 A1 | 2/2009 | Katsuda | | |
| 2024/0157861 A1* | 5/2024 | Scheede | ................ | B60N 2/181 |
| 2025/0145066 A1* | 5/2025 | Lin | ...................... | B60N 2/4263 |

* cited by examiner

LIFTER FOR VEHICLE SEAT BOTTOM

BACKGROUND

Vehicles are equipped with restraint systems fixed at various position in passenger compartments of vehicles, e.g., airbags and seatbelt assemblies, that may control the kinematics of an occupant in the event of the certain vehicle impacts. During certain vehicle impacts, e.g., certain frontal vehicle impacts, an occupant of a seat may be urged seat-forward against a chest portion and a lap portion of a seatbelt webbing. Certain vehicle impacts may urge movement of the occupant below the lap belt.

DETAILED DESCRIPTION

A seat assembly including a seat bottom including a seat frame and a seat cushion supported by the seat frame. The seat frame includes a first side portion and a second side portion spaced cross-seat from each other and the seat frame includes a seat pan extending from the first side portion to the second side portion. The seat assembly includes a cross-member supported by the seat frame between the seat frame and the seat cushion. The seat assembly includes a lifter extending from the seat frame to the cross-member. The lifter is extendable from a lowered position to a raised position. The cross-member abuts the seat pan when the lifter is in the lowered position. The cross-member is spaced from the seat pan when the lifter is in the raised position.

The seat cushion may abut the seat pan when the lifter is in the lowered position and the seat cushion is spaced upwardly from the seat pan when the lifter is in the raised position.

The lifter may include a member connected to the cross-member and a pyrotechnic device operatively coupled to the member. The member may be moveable from the lowered position to the raised position by the pyrotechnic device.

The lifter may include a base connected to the member, the member being slidably engaged with the member.

The seat assembly may include a computer including a processor and a memory storing instructions executable by the processor to detect certain vehicle impacts and activate the pyrotechnic device in response to detection of certain vehicle impacts.

The seat assembly may include a seatback supported by the seat bottom. The lifter may be spaced seat-forward of the seatback.

The seat cushion may include a first end at the seatback and a second end spaced seat-forward of the seatback. The seat cushion may extend continuously from the first end to the second end and the second end may be spaced upwardly from the seat pan when the lifter is in the raised position.

The seat cushion may include a first end and a second end spaced seat-forward of the first end. The seat cushion may extend continuously from the first end to the second end and the second end may be spaced upwardly from the first end when the lifter is in the raised position.

The cross-member may abut the seat cushion.

The seat pan may define a recess between the first side portion and the second side portion. The cross-member may be contoured to and fitted into the recess when the lifter is in the lowered position.

The lifter may extend through the seat pan.

The lifter may extend along an axis. The cross-member and seat cushion may be moveable along the axis as the lifter.

The lifter may be telescopically extendable from the lowered position to the raised position.

The cross-member may be between the seat pan and the seat cushion when the lifter is in the lowered position.

The cross-member is between the seat cushion and the lifter.

The cross-member may be spaced upwardly of the first side portion and the second side portion when the lifter is in the raised position.

The cross-member may be seat-rearward of the seat pan.

The seat pan may have a rearward-most edge. The seat pan may define an opening extending seat-forward of the rearward-most edge, the lifter extending through the opening.

The seat frame may include a frame-member spaced from the seat pan and extending from the first side portion to the second side portion.

The seat assembly may include a second lifter spaced cross-seat from the lifter, the second lifter extending from seat frame to the cross-member.

With reference to the Figures, wherein like numerals indicate like parts throughout the several views, a seat assembly 10 for a vehicle 12, hereinafter referred to as the "seat 10," includes a seat bottom 14 including a seat frame 16 and a seat cushion 18 supported by the seat frame 16. The seat frame 16 includes a first side portion 20 and a second side portion 22 spaced cross-seat from each other and the seat frame 16 includes a seat pan 24 extending from the first side portion 20 to the second side portion 22. The seat assembly 10 includes a cross-member 28 supported by the seat frame 16 between the seat frame 16 and the seat cushion 18. The seat assembly 10 includes a lifter 30, hereinafter referred to as the "first lifter 30," extending from the seat frame 16 to the cross-member 28. The first lifter 30 is extendable from a lowered position to a raised position. The cross-member 28 abuts the seat pan 24 when the first lifter 30 is in the lowered position. The cross-member 28 is spaced from the seat pan 24 when the first lifter 30 is in the raised position.

In the lowered position, the cross-member 28 abuts the seat pan 24 to minimize spacing between the seat cushion 18 and the seat pan 24. In the event of certain vehicle impacts, an occupant of the seat 10 may be urged to move seat-forward from the force of the vehicle impact. In the event of these certain vehicle impacts, the first lifter 30 may move to the raised position to move the cross-member 28 upwardly. The cross-member 28 moves away from the seat pan 24 to move the seat cushion 18 away from the seat frame 16. As the seat cushion 18 moves away from the seat frame 16, knees of an occupant of the seat 10 raise away from the seat pan 24. The rising of the knees allows the hips to lower, which may control the kinematics of the occupant.

Figure 1:
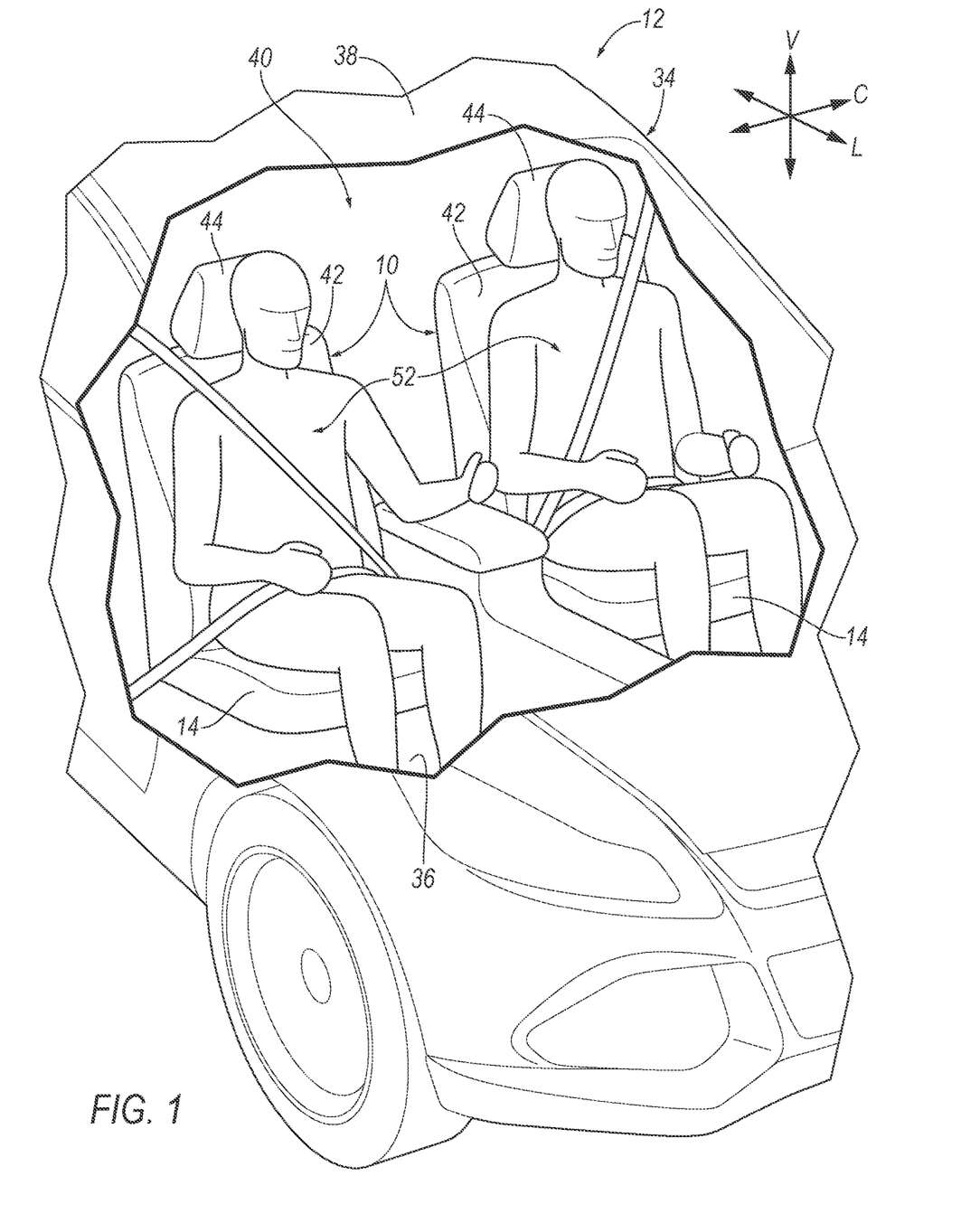
FIG. 1 is a perspective view of a vehicle.

With reference to FIGS. 1, the vehicle 12 may be any suitable type of ground vehicle, e.g., a passenger or commercial automobile such as a sedan, a coupe, a truck, a sport utility, a crossover, a van, a minivan, a taxi, a bus, etc. Operations, systems, and methods described herein should always be implemented and/or performed in accordance with an applicable owner's/user's manual and/or safety guidelines.

The vehicle 12 defines a vehicle-longitudinal axis L extending between a front vehicle end (not numbered) and a rear vehicle end (not shown) of the vehicle 12. The vehicle 12 defines a cross-vehicle axis C extending cross-vehicle from one side to the other side of the vehicle 12. The cross-vehicle direction C is parallel to the cross-vehicle axis C. The vehicle 12 defines a vertical axis V. The vehicle-longitudinal axis L, the cross-vehicle axis C, and the vertical axis V are perpendicular relative to each other.

As described further below, the vehicle 12 includes a body 34 including rockers (not numbered), roof rails, roof beams, pillars, body panels (not numbered), a vehicle floor 36, a vehicle roof 38, etc. The vehicle 12 includes a passenger compartment 40 to house occupants of the vehicle 12. The passenger compartment 40 may extend across the vehicle 12, i.e., from one side to the other side of the vehicle 12. The passenger compartment 40 includes a front end (not numbered) and a rear end (not shown) with the front end being in front of the rear end during forward movement of the vehicle 12.

The vehicle roof 38 and the vehicle floor 36 are spaced from each other. Specifically, the vehicle floor 36 is spaced downwardly from the vehicle roof 38. The vehicle roof 38 defines the upper boundary of the passenger compartment 40 and may extend from the front end of the passenger compartment 40 to the rear end of the passenger compartment 40. The vehicle roof 38 may include a roof panel (not numbered) extending from one roof rail to the other roof rail. The roof panel may be irremovably fixed to the roof rails. In other words, the roof panel is secured to the roof rails in such a way that removal requires destruction such as cutting, e.g., cutting material and/or welded joints, etc. As an example, the roof panel may be attached to both roof rails, e.g., by welding, fasteners, etc.

The vehicle 12 includes the vehicle floor 36 defining the lower boundary of the passenger compartment 40 and may extend from the front end of the passenger compartment 40 to the rear end of the passenger compartment 40. The vehicle floor 36 may include upholstery, for example, carpet, and may have a class-A surface facing the passenger compartment 40, i.e., a surface specifically manufactured to have a high quality, finished, aesthetic appearance free of blemishes.

With reference to FIGS. 2-5B, the vehicle 12 may include one or more seats 10.

Specifically, the vehicle 12 may include any suitable number of seats 10. As shown in Figure X, the seats 10 are supported by the vehicle floor 36. The seats 10 may be arranged in any suitable arrangement in the passenger compartment 40. One or more of the seats 10 may be at the front end of the passenger compartment 40, e.g., a driver seat and/or a passenger seat. In other examples, one or more of the seats 10 may be behind the front end of the passenger compartment 40, e.g., at the rear end of the passenger compartment 40. The seats 10 may be movable relative to the vehicle floor 36 to various positions, e.g., movable fore-and-aft and/or cross-vehicle. The seat 10 may be of any suitable type, e.g., a bucket seat.

The seats 10 include a seatback 42, the seat bottom 14, and a head restraint 44. The head restraint 44 may be supported by and extending upwardly from the seatback 42. The head restraint 44 may be stationary or movable relative to the seatback 42. The seatback 42 may be supported by the seat bottom 14 and may be stationary or movable relative to the seat bottom 14. The seatback 42 may extend from an upper end 46 to a lower end 48. The lower end 48 may be connected to the seat bottom 14. The upper end 46 of the seatback 42 may be spaced upwardly from the lower end 48 of the seatback 42, i.e., upwardly from the seat bottom 14. The seatback 42, the seat bottom 14, and the head restraint 44 may be adjustable in multiple degrees of freedom. Specifically, the seatback 42, the seat bottom 14, and the head restraint 44 may themselves be adjustable. In other words, adjustable components within the seatback 42, the seat bottom 14, and the head restraint 44 may be adjustable relative to each other.

The seatback 42 and the seat bottom 14 each include at least a portion of the seat frame 16. The seat frame 16 of the seat bottom 14 includes the first side portion 20 and the second side portion 22 spaced cross-seat from each other. The first side portion 20 and the second side portion 22 each define sides of the seat bottom 14. The seat frame 16 includes the seat pan 24 extending from the first side portion 20 to the second side portion 22. The seat pan 24 is connected to the first side portion 20 and the second side portion 22. Specifically, the seat pan 24 is fixed to, i.e., immovable relative to, the first side portion 20 and the second side portion 22. The seat pan 24 may be fixed in any suitable way, e.g., fasteners, welding, adhesive. The seat frame 16 may be of any suitable plastic material, e.g., carbon fiber reinforced plastic (CFRP), glass fiber-reinforced semi-finished thermoplastic composite (organosheet), etc. As another example, some or all components of the seat frame 16 may be formed of a suitable metal, e.g., steel, aluminum, etc.

The seat 10 includes a covering 50 supported on the seat frame 16. The covering 50 may include upholstery, padding, and/or plastic portions. Specifically, the covering 50 includes the seat cushion 18. The seat cushion 18 is supported by the seat frame 16. Specifically, the seat frame 16 is supported by the seat pan 24 when the lifter 30 and a second lifter 32, as described further below, are in the lowered positions. In other words, the seat cushion 18 abuts the seat pan 24 when the lifters 30, 32 are in the lowered positions. The seat pan 24 may bear the weight of the seat cushion 18 and an occupant of the seat 10 when the lifters 30, 32 are in the lowered positions. The seat cushion 18 includes a first end 54 and a second end 56 spaced from the first end 54. The first end 54 is at the seatback 42 and the second end 56 is spaced seat-forward of the seatback 42. Specifically, the second end 56 is spaced seat-forward of the first end 54. The seat cushion 18 extends continuously from the first end 54 to the second end 56. In other words, the seat cushion 18 is endless from the first end 54 to the second end 56. Each of the first side portion 20 and the second side portion 22 extend from the first end 54 of the seat bottom 14 to the second end 56 of the seat bottom 14. The seat cushion 18 includes a top surface 58 facing upwardly and a bottom surface 60 facing downwardly. The bottom surface 60 abuts the seat pan 24 when the lifters 30, 32 are in the lowered positions. The seat cushion 18 may be foam or any other suitable material. The upholstery may be cloth, leather, faux leather, or any other suitable material. The upholstery may be stitched in panels around the seat frame 16 and the seat cushion 18.

The seat frame 16 includes a frame-member 26 between the first side portion 20 and the second side portion 22. Specifically, the frame-member 26 extends from the first side portion 20 to the second side portion 22. The frame-member 26 is spaced from the seat pan 24. Specifically, the frame-member 26 is spaced downwardly from the frame-member 26. The seat pan 24 is between the frame-member 26 and the seat cushion 18. The frame-member 26 is spaced seat-forward of the seatback 42. In other words, the frame-member 26 is spaced seat-forward along the seat bottom 14 from the seatback 42. The frame-member 26 is between the first end 54 and the second end 56 of the seat bottom 14. Specifically, the frame-member 26 is spaced from the first end 54 and the frame-member 26 is spaced from the second end 56.

The seatback 42 and the seat bottom 14 define an occupant-seating area 52 of the seat 10. The occupant-seating area 52 is the area occupied by an occupant when properly seated on the seat bottom 14 and the seatback 42. The occupant-seating area 52 is seat-forward of the seatback 42 and above the seat bottom 14, e.g., the top surface 58 of the seat cushion 18. The top surface 58 of the seat cushion 18 faces toward the occupant-seating area 52 and the bottom surface 60 of the seat cushion 18 faces away from the occupant-seating area 52.

The seat cushion 18 of the seat 10 is moveable to allow the second end 56 to be spaced upwardly from the seat frame 16. In the event of certain vehicle impacts, the second end 56 of the seat cushion 18 moves upwardly away from the seat frame 16 to move knees of an occupant of the seat 10 upwardly. Moving the knees upwardly allows hips of the occupant to lower toward the seatback 42 and may control the kinematics of the occupant.

With reference to FIGS. 2A-5B, the seat 10 includes the cross-member 28 that is moveable relative to the seat frame 16 from a lowered position to a raised position. As described further below, the seat 10 includes one or more lifters 30, 32. Specifically, the seat 10 includes a pair of lifters 30, 32, e.g., the first lifter 30 and the second lifter 32, that are operatively coupled to the cross-member 28 to move the cross-member 28 from the lowered position to the raised position. In other words, the first lifter 30 and the second lifter 32 move from lowered positions to raised positions. The cross-member 28 is in the raised position when the lifters 30, 32 are in the raised positions and the cross-member 28 is in the lowered position when the lifters 30, 32 are in the lowered position.

The seat cushion 18 is moveable by the cross-member 28 and the lifters 30, 32.

Specifically, the cross-member 28 abuts the seat cushion 18 to move the seat cushion 18. As the lifters 30, 32 and the cross-member 28 move to the raised position, the seat cushion 18 moves away from the seat frame 16. In other words, as the lifters 30, 32 and the cross-member 28 move to the raised positions, the second end 56 of the seat cushion 18 moves away from the seat pan 24. The cross-member 28 is moveable away from the seat frame 16 to move the second end 56 of the seat cushion 18 away from the seat pan 24. Specifically, the cross-member 28 is moveable away from the seat pan 24 of the seat frame 16.

The seat 10 includes the cross-member 28 supported by the seat frame 16. Specifically, the cross-member 28 is supported by the frame-member 26 of the seat frame 16. The cross-member 28 is supported by the frame-member 26 between the frame-member 26 and the seat cushion 18. As described further below, the first lifter 30 and the second lifter 32 are between the cross-member 28 and the frame-member 26 to support the cross-member 28 by the frame-member 26. In the lowered position, the cross-member 28 is spaced upwardly from the frame-member 26. In other words, the cross-member 28 is spaced from the frame-member 26 by the first lifter 30 and the second lifter 32 when the lifters 30, 32 are in the lowered position. In the raised position, the cross-member 28 is spaced upwardly from the seat pan 24.

Figure 2A:
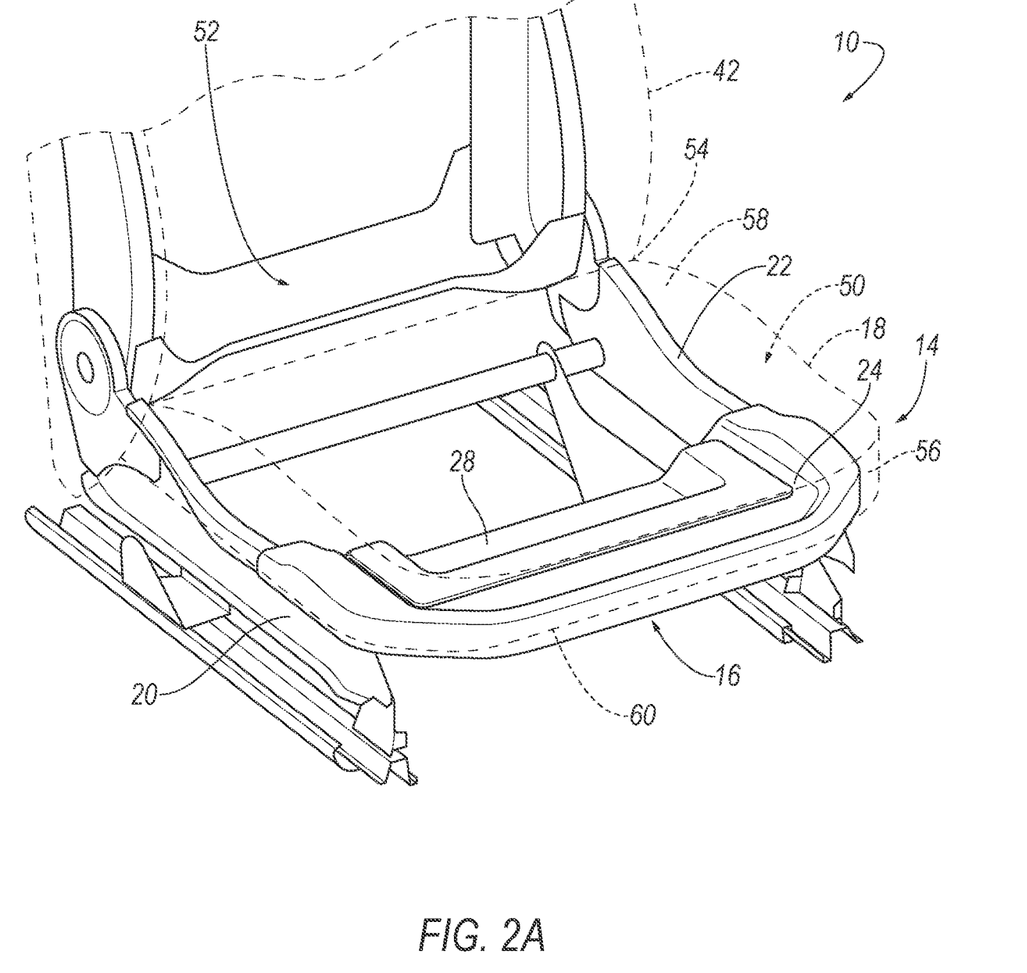
FIG. 2A is a perspective view of a seat having a seat bottom.
Figure 2B:
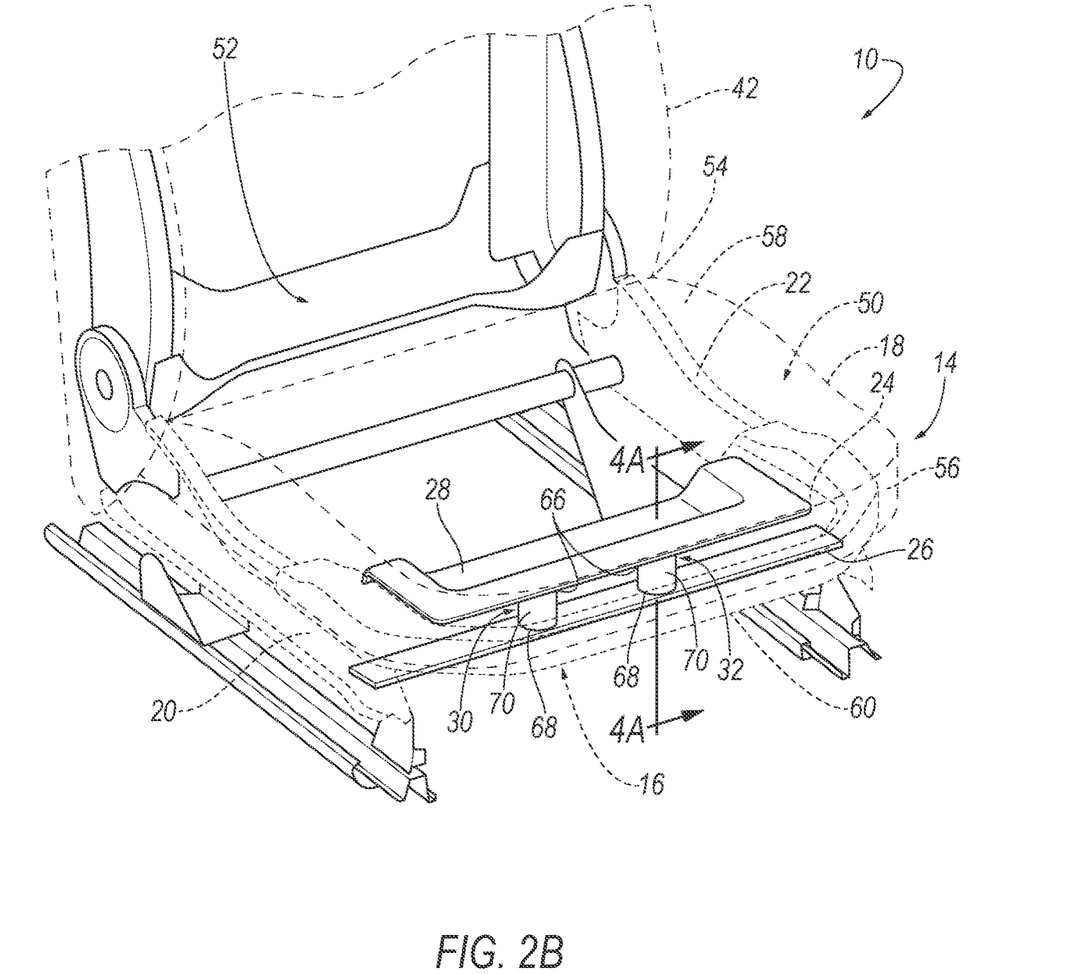
FIG. 2B is a perspective view of the seat having a pair of lifters and a cross-member in a lowered position.
Figure 3A:
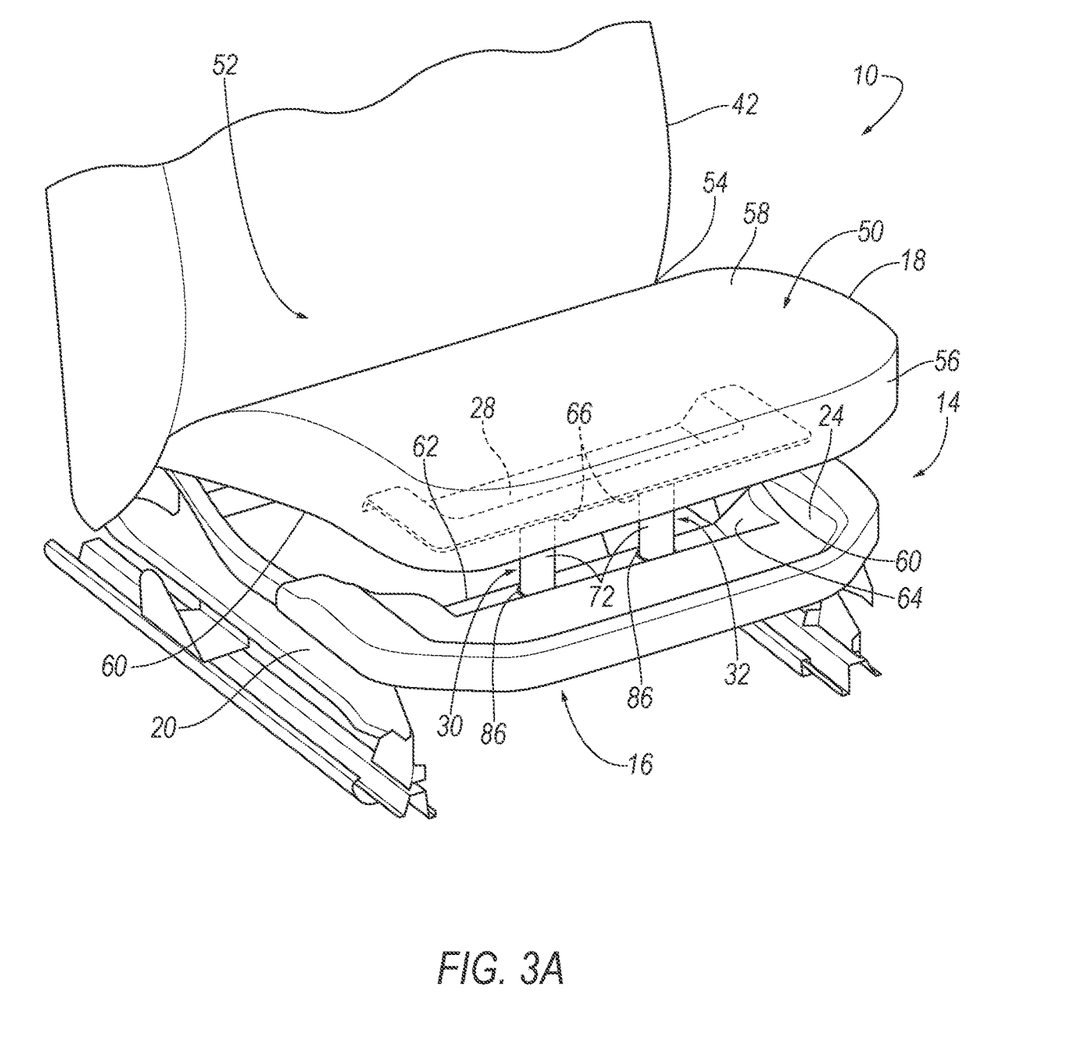
FIG. 3A is a perspective view of the seat having the pair of lifters and the cross-member in a raised position.
Figure 3B:
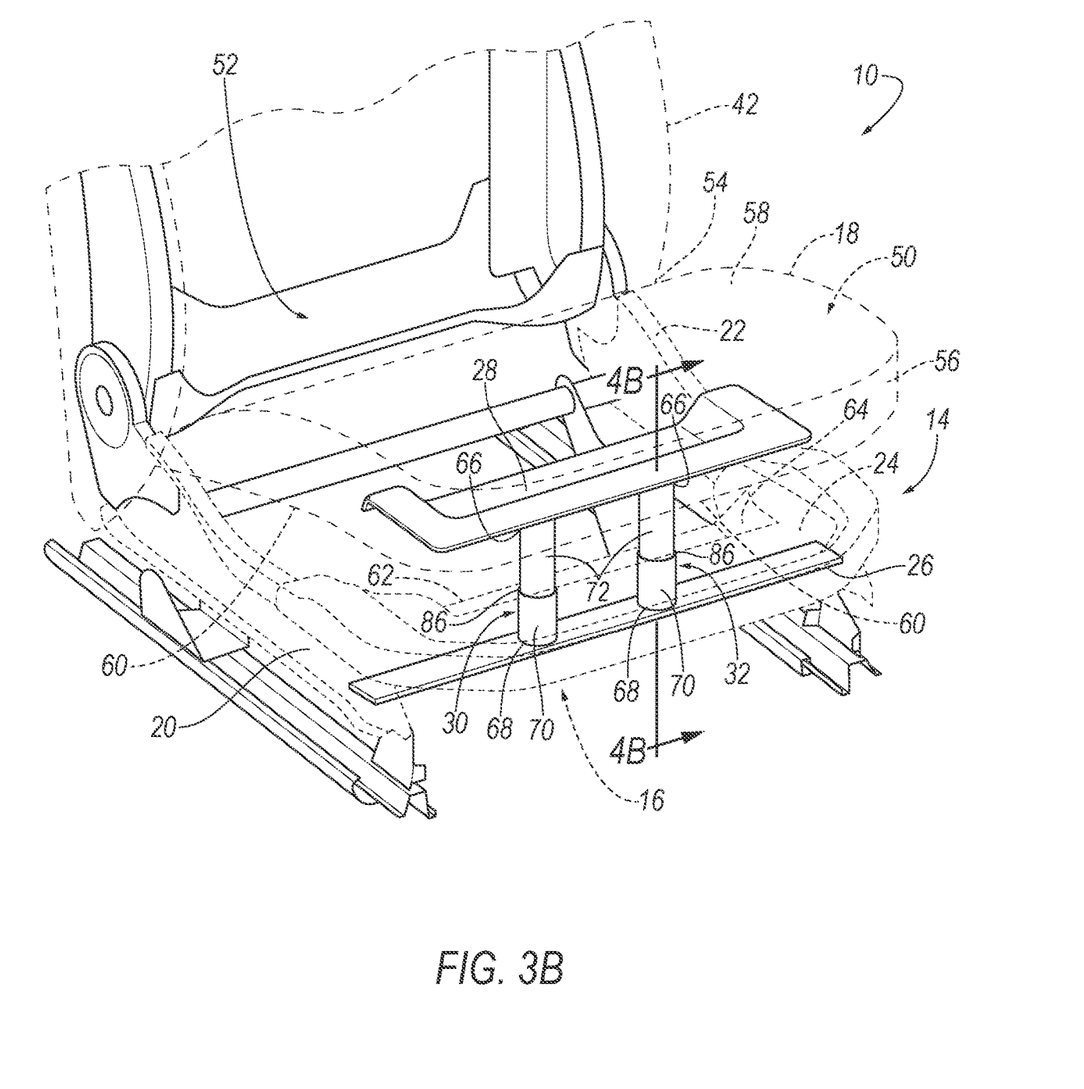
FIG. 3B is a perspective view of the seat having the pair of lifters and the cross-member in a raised position.

With reference to FIGS. 2A and 2B, the cross-member 28 is adjacent the seat pan 24 in the lowered position. The seat pan 24 has a rearward-most edge 62 spaced from the seatback 42. The cross-member 28 may be adjacent the rearward-most edge 62 of the seat pan 24. Specifically, the cross-member 28 may be seat-rearward of the seat pan 24. In other words, at least a portion of the cross-member 28 may be seat-rearward of the seat pan 24. At least a portion of the cross-member 28 may be seat-rearward of the rearward-most edge 62 of the seat pan 24, e.g., at least a portion of the cross-member 28 may be between the rearward-most edge 62 of the seat pan 24 and the seatback 42.

Specifically, the cross-member 28 abuts the seat pan 24 when the cross-member 28 is in the lowered position. The seat pan 24 may define a recess 64 between the first side portion 20 and the second side portion 22. The cross-member 28 abuts the seat pan 24 in the recess 64 when the cross-member 28 is in the lowered position. In other words, the cross-member 28 is contoured to and fitted into the recess 64 when the cross-member 28 is in the lowered position. In other words, the cross-member 28 may be sized and shaped to fit into the recess 64. In the lowered position, because the cross-member 28 is contoured to the recess 64, the seat cushion 18 abuts both the seat pan 24 and the cross-member 28. In other words, the seat pan 24 and the cross-member 28 bear the weight of the seat cushion 18 and an occupant of the seat 10 when the cross-member 28 is in the lowered position. The cross-member 28 may be contoured to the bottom surface 60 of the seat cushion 18 to abut the seat cushion 18 in the lowered position. In other words, the cross-member 28 is sized and shaped to follow the contour of the bottom surface 60 of the seat cushion 18. The cross-member 28 is between the seat pan 24 and the seat cushion 18 when the lifters 30, 32 and the cross-member 28 are in the lowered positions.

With reference to FIGS. 3A, 3B, 4B, and 5B, in the raised position, the cross-member 28 is spaced from the seat pan 24. The cross-member 28 is spaced upwardly from the seat pan 24, the first side portion 20, and the second side portion 22 when the cross-member 28 and lifters 30, 32 are in the raised position. As the cross-member 28 moves to the raised position, the seat cushion 18 moves away from the seat frame 16. In other words, in the raised position, the seat cushion 18 is spaced from the seat frame 16. Specifically, in the raised position, the second end 56 of the seat cushion 18 is spaced upwardly from seat pan 24, the first side portion 20, and the second side portion 22. As the second end 56 of the seat cushion 18 moves upwardly, the knees of the occupant of the seat 10 may be raised away from the seat frame 16 and the hips of the occupant of the seat 10 may lower and move toward the seatback 42.

The cross-member 28 may be of any suitable cross-section and shape. For example, as shown in the Figures, the cross-member 28 may be long along the cross-vehicle axis C and short along the seat pan 24. In such an example, the cross-member 28 may be generally smooth and flat between the seat pan 24 and the seat cushion 18. In other examples, the cross-member 28 may have a circular cross-section, e.g., a tube or rod.

Figure 4A:
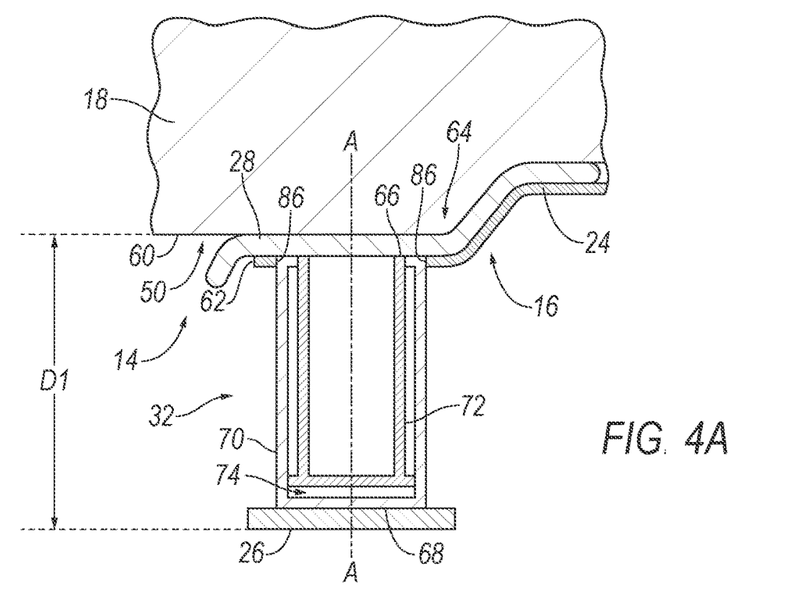
FIG. 4A is a cross-sectional view through line 4A of FIG. 2B.
Figure 4B:
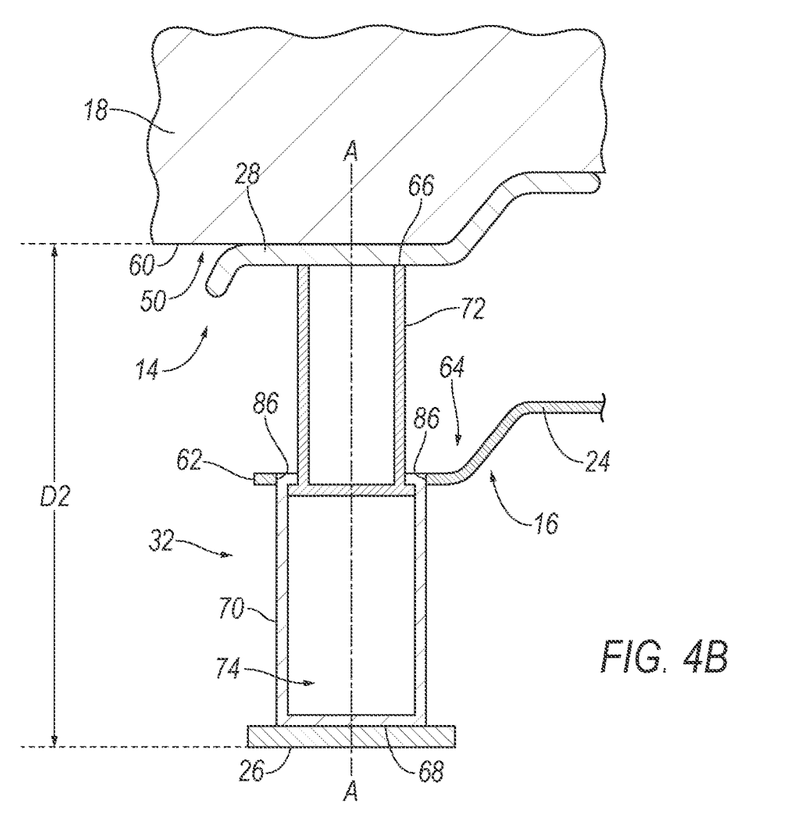
FIG. 4B is a cross-sectional view through line 4B of FIG. 3B.
Figure 5A:
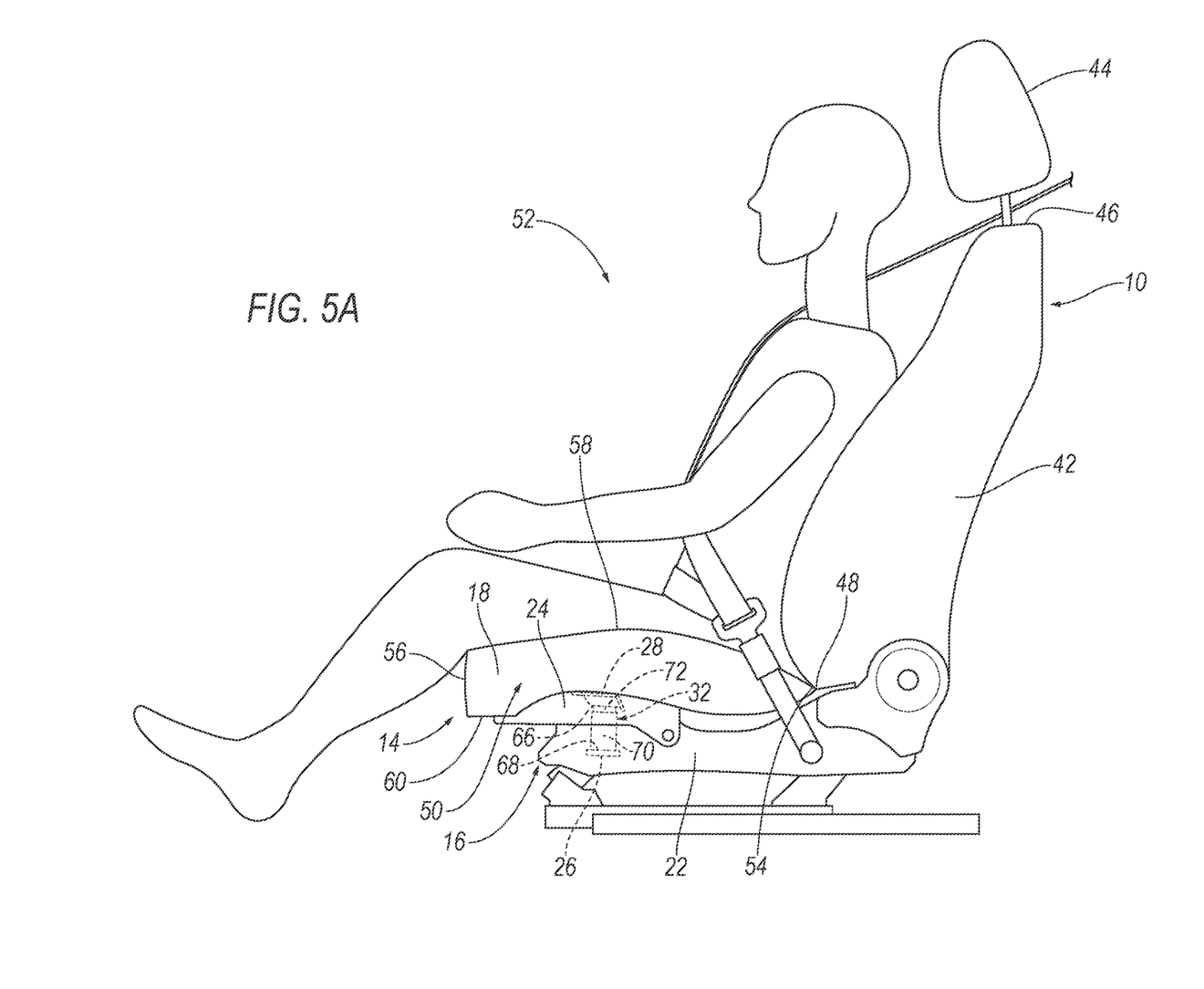
FIG. 5A is a side view of the seat with the lifters and cross-member in the lowered position.
Figure 5B:
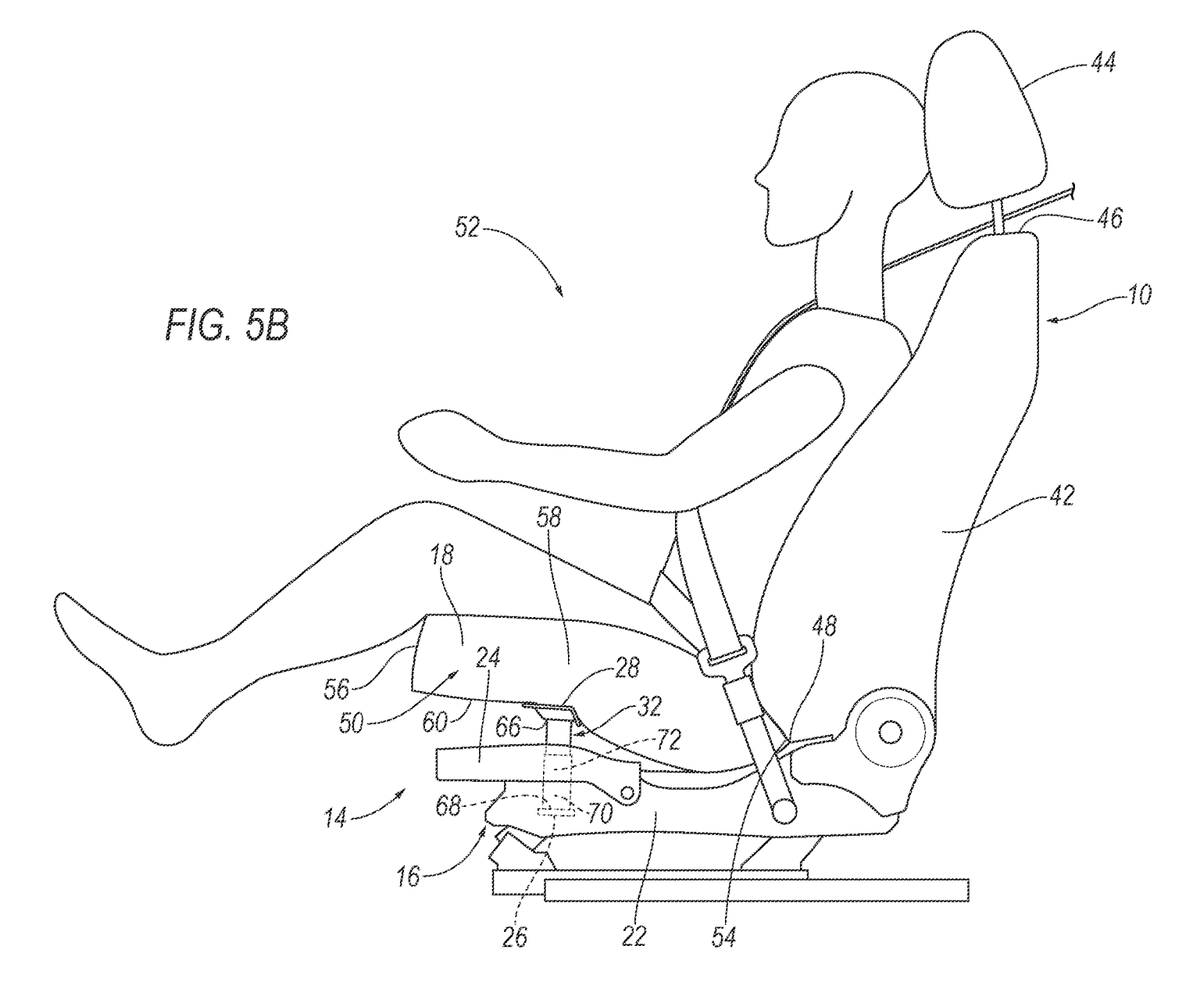
FIG. 5B is a side view of the seat with the lifters and the cross-member in the raised position.

With reference to FIGS. 4A and 4B, as discussed above, the seat 10 includes the first lifter 30 and the second lifter 32. Each of the lifters 30, 32 is supported by the frame-member 26 and connected to the cross-member 28. In other words, each lifter is spaced seat-forward of the seatback 42. The lifters 30, 32 may be between the seat pan 24 and the seatback 42 along the seat bottom 14. The lifters 30, 32 may be adjacent the rearward-most edge 62 of the seat pan 24. The lifters 30, 32 may extend through the seat pan 24 at the rearward-most edge 62. The seat pan 24 may define one or more openings 86 extending seat-forward of the rearward-most edge 62. the lifters 30, 32 may extend through the one or more of the openings 86. As in the example shown in the Figures, the openings 86 may be completely surrounded by the seat pan 24, e.g., the openings 86 are circular in the seat pan 24. In other examples, the openings 86 may be open at the rearward-most edge 62, e.g., the openings 86 are semi-circular in the seat pan 24. The first lifter 30 is spaced from the second lifter 32 along the frame-member 26. The first lifter 30 is spaced from the second lifter 32 along the cross-member 28. In other words, the first lifter 30 and the second lifter 32 are spaced cross-seat from each other.

Each of the first lifter 30 and the second lifter 32 extend along an axis A. Specifically, each of the lifters 30, 32 extend from a top end 66 to a bottom end 68 along the axis A. The lifters 30, 32 are between the cross-member 28 and the frame-member 26. Each of the lifters 30, 32 extends from the frame-member 26 to the cross-member 28. Specifically, each of the lifters 30, 32 extends along the axis A from the frame-member 26 to the cross-member 28. The cross-member 28 is between the seat cushion 18 and the lifters 30, 32. The top ends 66 of the lifters 30, 32 are connected to the frame-member 26 and the bottom ends 68 of the lifters 30, 32 are connected to the cross-member 28. The bottom ends 68 are spaced upwardly from the top ends 66. The top ends 66 and the bottom ends 68 may be connected to the frame-member 26 and the cross-member 28 in any suitable way such that the top ends 66 are fixed to the frame-member 26 and the bottom ends 68 are fixed to the cross-member 28, e.g., fasteners, welding, etc.

Each of the lifters 30, 32 is operatively coupled to the cross-member 28 to move the cross-member 28 from the lowered position to the raised position in the event of certain vehicle impacts. In other words, as the lifters 30, 32 move from the lowered position to the raised position, the cross-member 28 moves from the lowered position to the raised position. The lifters 30, 32 are each extendable from the lowered positions to the raised positions. In other words, the lifters 30, 32 are extendable along the axis A. The lifters 30, 32 move from the lowered position to the raised position to extend along the axis A.

The seat cushion 18 and the cross-member 28 are moveable along the axis A as the first lifter 30 and the second lifter 32 move from the lowered position to the raised position. Specifically, the bottom end 68 and the cross-member 28 are moveable along the axis A as the lifters 30, 32 move to the raised position. The cross-member 28 is spaced from the frame-member 26 a first distance D1 when the lifters 30, 32 are in the lowered position and the cross-member 28 is spaced from the frame-member 26 by a second distance D2 when the lifters 30, 32 are in the raised position. The second distance D2 is greater than the first distance D1. In other words, the cross-member 28 is space farther from the frame-member 26 when the lifters 30, 32 are in the raised position than when the lifters 30, 32 are in the lowered position. The top ends 66 and the bottom ends 68 move away from each other as the lifters 30, 32 move toward the raised position.

In the event of a certain vehicle impacts, the lifters 30, 32 move from the lowered position to the raised position to move the cross-member 28 from the lowered position to the raised position. When the lifters 30, 32 are in the lowered positions, the cross-member 28 abuts the seat pan 24 and the seat cushion 18 abuts the seat pan 24. As the lifters 30, 32 move to the raised position, the cross-member 28 and the seat cushion 18 move upwardly and away from the seat frame 16. In other words, when the lifters 30, 32 are in the raised positions, the cross-member 28 and the second end 56 of the seat cushion 18 are spaced upwardly from the seat frame 16. Specifically, when the lifters 30, 32 are in the raised positions, the cross-member 28 and the second end 56 of the seat cushion 18 is spaced upwardly from the seat pan 24. As the seat cushion 18 moves upwardly, the knees of the occupant move upwardly.

With continued reference to FIGS. 4A and 4B, the first lifter 30 and the second lifter 32 may be telescopically extendable from the lowered positions to the raised positions. In other words, the lifters 30, 32 may include multiple sections 70, 72 that are moveable relative to each other to extend along the axis A. Specifically, the lifters 30, 32 may each include a base 70 and a member 72 that is slidable relative to the base 70. The members 72 may be slidably engaged with the base 70. As the lifters 30, 32 move to the raised position, the members 72 moves along the bases 70 until the lifters 30, 32 reach the raised position. Specifically, the bases 70 may define a tube 74 that receives the member 72. The members 72 are slidable within the tube 74 of the bases 70. The members 72 may be nestable with the bases 70 when the lifters 30, 32 are in the lowered position. In other words, the members 72 are sized and shaped to fit into the tubes 74 of the bases 70 when the lifters 30, 32 are in the lowered position. As the lifters 30, 32 move to the raised position, the members 72 slide along the bases 70 to extend the lifters 30, 32 to the raised position.

The bases 70 may be connected to the frame-member 26 and the members 72 may be connected to the cross-member 28. Specifically, the bases 70 may be fixed to the frame-member 26 and the members 72 may be fixed to the cross-member 28. The members 72 may include the top ends 66 and the bases 70 include the bottom ends 68.

The lifters 30, 32 move to the raised position simultaneously. In other words, the lifters 30, 32 move to the raised position at the same time to allow the cross-member 28 to move away from the frame-member 26. The lifters 30, 32 move to the raised position such that members move an equal distance at the same time. The lifters 30, 32 moving simultaneously allows the seat cushion 18 to evenly move away from the seat frame 16.

The lifters 30, 32 each include a pyrotechnic device 76. The pyrotechnic device 76 is operatively coupled to the member 72 to move the member 72 to the raised position. The pyrotechnic devices 76 may be activated in the event of certain vehicle impacts to move the members 72 to the raised positions. In other words, the members 72 are moveable from the lowered positions to the raised positions by the pyrotechnic devices 76. In the event of certain vehicle impacts, each of the pyrotechnic devices 76 activate simultaneously. Specifically, the pyrotechnic devices 76 activate simultaneously to allow the members 72 of the lifters 30, 32 to move at the same time and at an equal distance.

The pyrotechnic devices 76 include a pyrotechnic charge that activates to move the members 72 to the raised positions. The pyrotechnic charge may be combustible to produce a gas. The pyrotechnic charge may be formed of a solid mixture of substances that, when ignited, react to produce the gas. For example, the pyrotechnic charge may be formed of sodium azide ($NaNO_3$), potassium nitrate ($KNO_3$), and silicon dioxide ($SiO_2$), which react to form nitrogen gas ($N_2$).

Once the lifters 30, 32 and the cross-member 28 are in the raised position, the lifters 30, 32 maintain the cross-member 28 in the raised position. In other words, the lifters 30, 32 may lock in the raised position to maintain the cross-member 28 in the raised position after the pyrotechnic devices 76 are activated. For example, the lifters 30, 32 may include a lock (not shown) that engages when the lifters 30, 32 are in the raised position. The lock may be of any suitable type.

Figure 6:
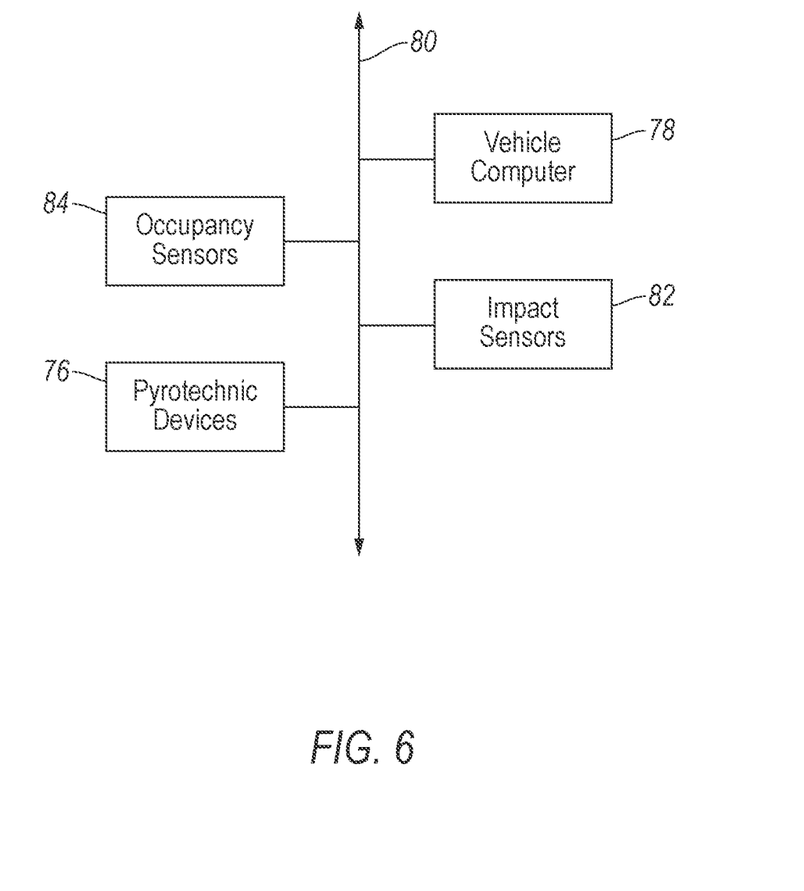
FIG. 6 is a block diagram of a vehicle communication network of the vehicle.

With reference to FIG. 6, the vehicle includes a vehicle computer 78 includes a processor and a memory storing instructions executable by the processor. The memory includes one or more forms of computer readable media, and stores instructions executable by the vehicle computer 78 for performing various operations, including as disclosed herein. The vehicle computer 78 may be a restraints control module. The vehicle computer 78 can be a generic computer with the processor and the memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the vehicle computer 78 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 78.

The vehicle computer 78 is generally arranged for communications on a vehicle communication network 80 that can include a bus in the vehicle 12 such as a controller area network CAN or the like, and/or other wired and/or wireless mechanisms. Alternatively or additionally, in cases where the vehicle computer 78 actually comprises a plurality of devices, the vehicle communication network 80 may be used for communications between devices represented as the vehicle computer 78 in this disclosure. Further, as mentioned below, various controllers and/or sensors may provide data to the vehicle computer 78 via the vehicle communication network 80.

The vehicle 12 may include at least one impact sensor 82 for sensing certain vehicle impacts (e.g., impacts of a certain magnitude, direction, etc.). The impact sensor 82 may be configured to sense certain vehicle impacts prior to impact, i.e., pre-impact sensing. The impact sensor 82 may be in communication with the vehicle computer 78. The impact sensor 82 is configured to detect certain vehicle impacts. In other words, a "certain vehicle impact" is an impact of the type and/or magnitude for which the lifters 30, 32 move to the raised position, i.e., "certain" indicates the type and/or magnitude of the impact. The type and/or magnitude of such "certain vehicle impacts" may be prestored in the vehicle computer 78, e.g., a restraints control module. The impact sensor 82 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 82 may be located at numerous points in or on the vehicle 12.

The vehicle 12 may include at least one occupancy sensor 84. The occupancy sensor 84 is configured to detect occupancy of the seats 10, e.g., detect an occupant in the occupant-seating area 52. The occupancy sensor 84 may be visible-light or infrared cameras directed at the seat 10, weight sensors supported by the seat bottom 14, sensors detecting whether a seatbelt assembly (not shown) for the seat 10 is buckled, or other suitable sensors. The occupancy sensor 84 provides data to the computer specifying whether the seat 10 is occupied or unoccupied and information regarding the type of occupant. As one example, the vehicle 12 may include one occupancy sensor 84 for each occupant-seating area 52. As another example, the vehicle 12 may include one occupancy sensor 84 that is designed to individually detect occupancy of each occupant-seating area 52.

Figure 7:
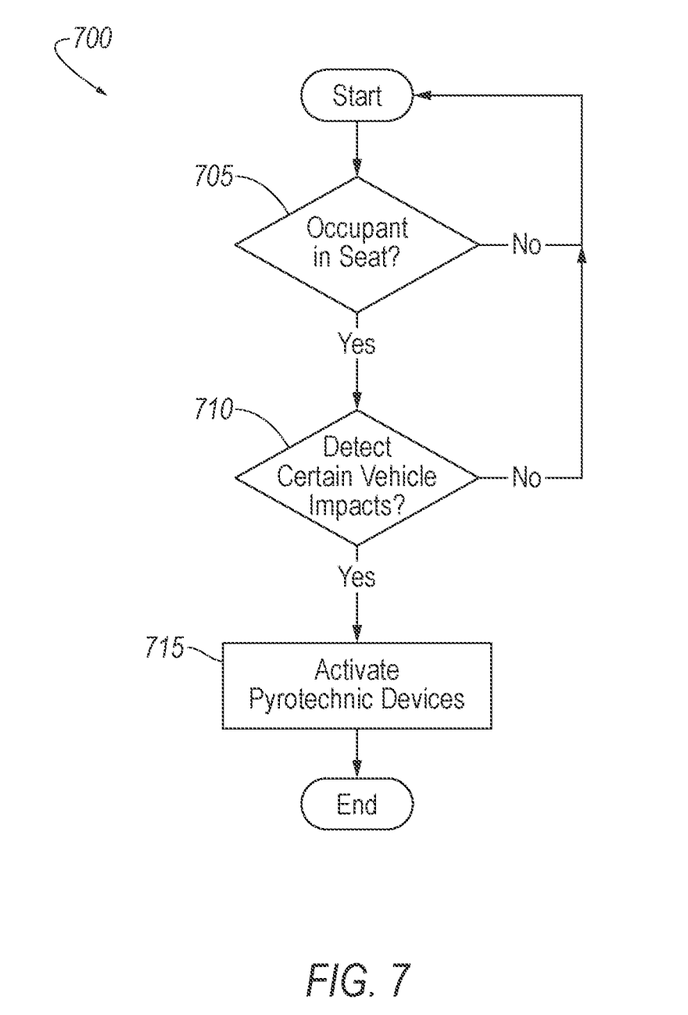
FIG. 7 is a flow chart of an example method executable by a vehicle computer.

With reference to FIG. 7, the vehicle computer 78 stores instructions to control components of the vehicle 12 according to the method. Specifically, as shown in Figure X, the vehicle computer 78 may detect certain vehicle impacts and activate the pyrotechnic devices 76 to move the lifters 30, 32 to the raised positions. Use of "in response to," "based on," and "upon determining" herein, including with reference to method, indicates a causal relationship, not merely a temporal relationship.

With reference to decision block 705, the method includes identifying whether an occupant is seated in the seat 10. The occupancy sensor 84 may send a signal to the vehicle computer 78 identifying an occupant is seated in the seat 10. If no occupant is detected in the seat 10, the method returns to its start. If an occupant is detected in the seat 10, the method moves to decision block 710.

With reference to decision block 710, the method includes detecting certain vehicle impacts. The impact sensors 82 may send a signal to the vehicle computer 78 indicating that certain vehicle impacts are detected. If certain vehicle impacts are not detected, the method returns to decision block 705. If certain vehicle impacts are detected, the method moves to block 715.

With reference to block 715, the method includes, in response to detection of certain vehicle impacts, activating the pyrotechnic devices 76. The vehicle computer 78 may send a signal to the pyrotechnic devices 76 to activate. The activation of the pyrotechnic devices 76 moves the members 72 of the lifters 30, 32 to the raised position to move the second end 56 of the seat cushion 18 away from the seat frame 16.

The disclosure has been described in an illustrative manner, and it is to be understood that the terminology which has been used is intended to be in the nature of words of description rather than of limitation. The numerical adjectives "first" and "second" are used herein merely as identifiers and do not signify order or importance. Many modifications and variations of the present disclosure are possible in light of the above teachings, and the disclosure may be practiced otherwise than as specifically described.

What is claimed is:

1. A seat assembly comprising:
a seat bottom including a seat frame and a seat cushion supported by the seat frame, the seat frame including a first side portion and a second side portion spaced cross-seat from each other and the seat frame including a seat pan extending from the first side portion to the second side portion;
a cross-member supported by the seat frame between the seat frame and the seat cushion; and
a lifter extending from the seat frame to the cross-member, the lifter being extendable from a lowered position to a raised position;
the cross-member abutting the seat pan when the lifter is in the lowered position and the cross-member being spaced from the seat pan when the lifter is in the raised position; and
the seat cushion abutting the seat pan when the lifter is in the lowered position and the seat cushion being spaced upwardly from the seat pan when the lifter is in the raised position.

2. The seat assembly of claim 1, wherein the lifter includes a member connected to the cross-member and a pyrotechnic device operatively coupled to the member, the member being moveable from the lowered position to the raised position by the pyrotechnic device.

3. The seat assembly of claim 2, wherein the lifter includes a base connected to the member, the member being slidably engaged with the base.

4. The seat assembly of claim 2, further comprising a computer including a processor and a memory storing instructions executable by the processor to:
detect certain vehicle impacts; and
activate the pyrotechnic device in response to detection of certain vehicle impacts.

5. The seat assembly of claim 1, further comprising a seatback supported by the seat bottom, the lifter being spaced seat-forward of the seatback.

6. The seat assembly of claim 1, wherein the seat cushion includes a first end and a second end spaced seat-forward of the first end, the seat cushion extending continuously from the first end to the second end and the second end being spaced upwardly from the first end when the lifter is in the raised position.

7. The seat assembly of claim 1, wherein the cross-member abuts the seat cushion.

8. The seat assembly of claim 1, wherein the seat pan defines a recess between the first side portion and the second side portion, the cross-member being contoured to and fitted into the recess when the lifter is in the lowered position.

9. The seat assembly of claim 1, wherein the lifter extends through the seat pan.

10. The seat assembly of claim 1, wherein the lifter extends along an axis, the cross-member and seat cushion being moveable along the axis as the lifter.

11. The seat assembly of claim 1, wherein the lifter is telescopically extendable from the lowered position to the raised position.

12. The seat assembly of claim 1, wherein the cross-member is between the seat pan and the seat cushion when the lifter is in the lowered position.

13. The seat assembly of claim 1, wherein the cross-member is between the seat cushion and the lifter.

14. The seat assembly of claim 1, wherein the cross-member is spaced upwardly of the first side portion and the second side portion when the lifter is in the raised position.

15. The seat assembly of claim 1, wherein the cross-member is seat-rearward of the seat pan.

16. The seat assembly of claim 1, wherein the seat pan has a rearward-most edge, the seat pan defining an opening extending seat-forward of the rearward-most edge, the lifter extending through the opening.

17. The seat assembly of claim 1, wherein the seat frame includes a frame-member spaced from the seat pan and extending from the first side portion to the second side portion.

18. The seat assembly of claim 1, further comprising a second lifter spaced cross-seat from the lifter, the second lifter extending from seat frame to the cross-member.

19. A seat assembly comprising:
a seat bottom including a seat frame and a seat cushion supported by the seat frame, the seat frame including a first side portion and a second side portion spaced cross-seat from each other and the seat frame including a seat pan extending from the first side portion to the second side portion;
a cross-member supported by the seat frame between the seat frame and the seat cushion; and
a lifter extending from the seat frame to the cross-member, the lifter being extendable from a lowered position to a raised position;
the cross-member abutting the seat pan when the lifter is in the lowered position and the cross-member being spaced from the seat pan when the lifter is in the raised position; and
the seat pan defining a recess between the first side portion and the second side portion, the cross-member being contoured to and fitted into the recess when the lifter is in the lowered position.

20. A seat assembly comprising:
a seat bottom including a seat frame and a seat cushion supported by the seat frame, the seat frame including a first side portion and a second side portion spaced cross-seat from each other and the seat frame including a seat pan extending from the first side portion to the second side portion;
a cross-member supported by the seat frame between the seat frame and the seat cushion; and
a lifter extending from the seat frame to the cross-member, the lifter being extendable from a lowered position to a raised position;
the cross-member abutting the seat pan when the lifter is in the lowered position and the cross-member being spaced from the seat pan when the lifter is in the raised position; and
the cross-member being seat-rearward of the seat pan.

* * * * *